United States Patent
Hafuka (10) Patent No.: US 7,711,036 B2
(45) Date of Patent: May 4, 2010

(54) SYNCHRONOUS ACQUISITION CIRCUIT AND A SYNCHRONOUS ACQUISITION METHOD OF A SPREAD SPECTRUM CODE

(75) Inventor: Takamitsu Hafuka, Tokyo (JP)

(73) Assignee: Oki Semiconductor Co., Ltd., Tokyo (JP)

( * ) Notice: Subject to any disclaimer, the term of this patent is extended or adjusted under 35 U.S.C. 154(b) by 1273 days.

(21) Appl. No.: 11/220,547

(22) Filed: Sep. 8, 2005

(65) Prior Publication Data
US 2006/0072653 A1 Apr. 6, 2006

(30) Foreign Application Priority Data
Oct. 1, 2004 (JP) .............................. 2004-289781

(51) Int. Cl.
*H04B 1/00* (2006.01)
(52) U.S. Cl. .................. 375/149; 375/142; 375/145; 375/359
(58) Field of Classification Search ................. 375/130, 375/140, 41, 145, 147, 149, 354, 359, 141
See application file for complete search history.

(56) References Cited

U.S. PATENT DOCUMENTS 4,533,964 A * 8/1985 Owaki et al. .................. 360/22
5,255,292 A * 10/1993 LaRosa et al. ............... 375/368
2003/0231704 A1 * 12/2003 Tanaka et al. ............... 375/150
2003/0235241 A1 * 12/2003 Tamura ...................... 375/150

FOREIGN PATENT DOCUMENTS

| JP | 7-131378 | 5/1995 |
| JP | 2653421 | 5/1997 |

* cited by examiner

*Primary Examiner*—Shuwang Liu
*Assistant Examiner*—James M Perez
(74) *Attorney, Agent, or Firm*—Volentine & Whitt, P.L.L.C.

(57) ABSTRACT

In a synchronous acquisition method of a spread spectrum code, a digital code sequence is generated based on a received radio communication signal. The digital code sequence defines a spread spectrum code which includes a preamble symbol. A plurality of correlation signals are generated based on the spread spectrum code of the digital code sequence. A detection signal is generated in accordance with the correlation signal which corresponds to the preamble symbol. A timing control signal is generated in accordance with the detection signal. A demodulation signal is generated based on the correlation signals and in accordance with the timing control signal. A correction signal is generated based on the demodulation signal. A corrected timing control signal is generated based on the timing control signal and the correction signal, such that the demodulation signal corresponds to the preamble symbol.

7 Claims, 4 Drawing Sheets

SYNCHRONOUS ACQUISITION CIRCUIT AND A SYNCHRONOUS ACQUISITION METHOD OF A SPREAD SPECTRUM CODE

BACKGROUND OF THE INVENTION

1. Field of the Invention

The present invention relates to a synchronous acquisition circuit and a synchronous acquisition method of a spread spectrum code, in particular, to a synchronous acquisition circuit and a synchronous acquisition method of a direct sequence spread spectrum code. This is a counterpart of and claims priority to Japanese-Patent Application No. 2004-289781 filed on Oct. 1, 2004, which is herein incorporated by reference.

2. Description of the Related Art

Figure 1:
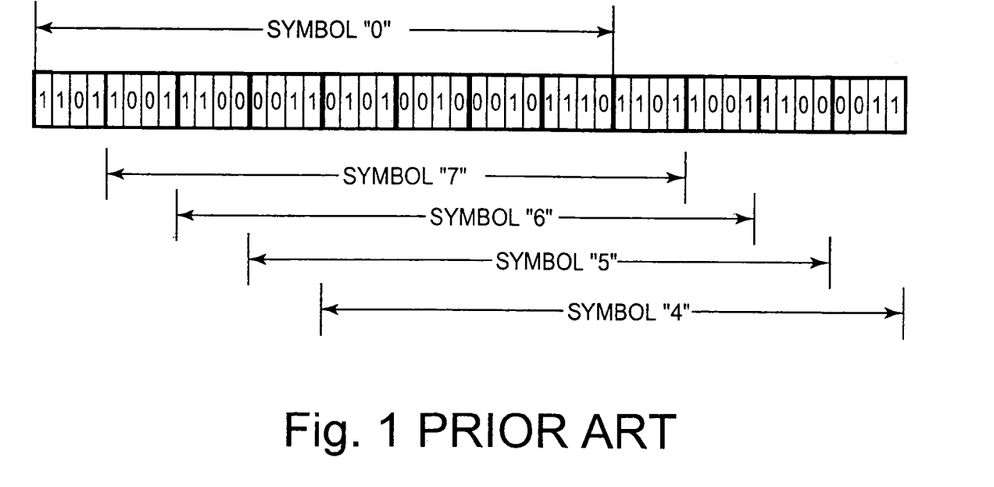
FIG. 1 shows an instance of a digital code sequence which includes a plurality of the spread spectrum codes used in a direct sequence spread spectrum communication.

FIG. 1 shows an instance of a digital code sequence which includes a plurality of the spread spectrum codes used in a direct sequence spread spectrum communication.

The spread spectrum codes as shown in FIG. 1 are cyclic shift type codes defined by a standard of IEEE 802.15.4 which is applied to an interface of a ZigBee physical layer. The ZigBee is a standard for a close-range radio communication which is executed in a 2.4 GHz Industrial Scientific Medical bandpass. Also, the digital code sequence is a pseudo random pattern, and the pseudo random pattern provides eight spread spectrum codes which are respectively composed of thirty-two chips, by cyclically shifting a starting location of the pseudo random pattern on 4-chip basis. Hereupon, each of the chips corresponds to a code of "0" or "1" and is equated with a "bit". A plurality of symbols of "0" through "7" are assigned to respective ones of eight kinds of the spread code. As shown in FIG. 1, for example, the symbol "0" is assigned to the spread code which starts with "1101" and ends with "1110." Also, the symbol "7" is assigned to the spread code which starts with "1001" and ends with "1101."

Figure 2:
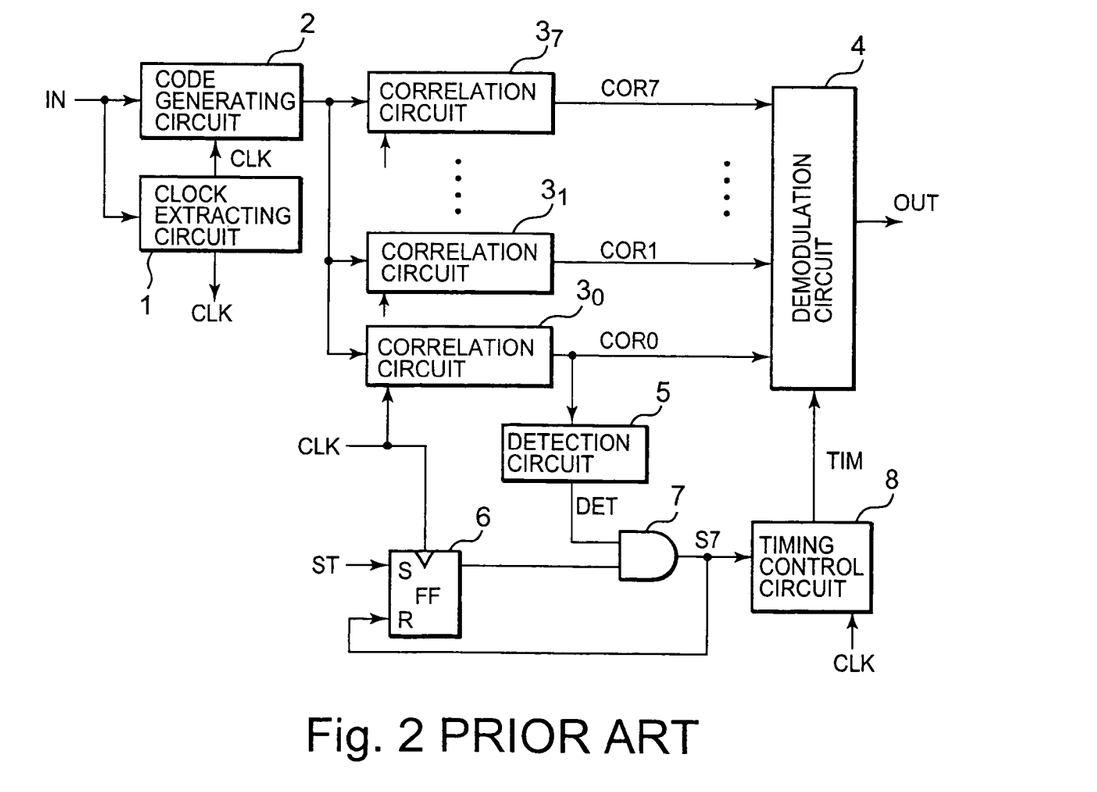
FIG. 2 is a circuit block diagram for describing a synchronous acquisition circuit of the spread spectrum code in the related art.

FIG. 2 is a circuit block diagram for describing a synchronous acquisition circuit of the spread spectrum code in the related art. The synchronous acquisition circuit includes a clock extracting circuit 1 and a code generating circuit 2. The clock extracting circuit 1 generates a clock signal CLK based on a signal IN which is output from a detection circuit of a radio receiver. The code generating circuit 2 converts the signal IN into a digital signal of "0" or "1" in accordance with the clock signal CLK, in order to generate the digital code sequence. The digital code sequence which is output from the code generating circuit 2 is provided to respective ones of eight correlation circuits 3-0 through 3-7. Each of the correlation circuits 3-0 through 3-7 corresponds to respective ones of the eight spread spectrum codes. The correlation circuits 3-0 through 3-7 check correlations between the digital code sequence and the spread spectrum codes in accordance with the clock signal CLK, in order to generate a plurality of correlation signals COR0 through COR7. The correlation signals COR0 through COR7 are provided to a demodulation circuit 4. The demodulation circuit 4 selects one of the correlation circuits 3-0 through 3-7 which generates a correlation signal which includes the greatest correlation value which exceeds a predetermined threshold correlation value when the demodulation circuit 4 receives a timing signal TIM, and then outputs one of symbols generated from the selected one of the correlation circuits 3-0 through 3-7 as a demodulation signal OUT.

Furthermore, the synchronous acquisition circuit includes a preamble detection circuit 5 and a set-reset type flip-flop circuit 6 in order to realize synchronization with respect to receiving radio communication signals. In actual radio communication, a specific pattern is prepended to transmit data of the radio communication signal as a preamble symbol. Hereupon, four consecutive spread spectrum codes of the symbol "0" are transmitted as the preamble symbol, prior to the transmit data. The preamble detection circuit 5 receives the correlation signal COR0 which is output from the correlation circuit 3-0. When the correlation signal COR0 has a correlation value which exceeds the predetermined threshold correlation value, the preamble detection circuit 5 generates a detection signal DET for a two-input AND circuit 7. The set-reset flip-flop circuit 6 has a set-terminal S which receives a reception starting signal ST which is indicative of starting a signal reception and has an output terminal coupled to an input terminal of the AND circuit 7. The AND circuit 7 generates an output signal S7 for a reset-terminal R of the set-reset flip-flop circuit 6 and a timing control circuit 8. The timing control circuit 8 counts a pulse number of the clock signal CLK, in order to generate the timing control signal TIM which has a width of one of the clock signal CLK every 32-chips which corresponds to a width of one of the symbols. The timing control circuit 8 starts counting the pulse number of the clock signal CLK when receiving the output signal S7 from the AND circuit 7.

Details of the operations with respect to the above-mentioned synchronous acquisition circuit are described below. When the set-reset flip-flop circuit 6 receives the reception starting signal ST, the set-reset flip-flop circuit 6 is set and then the AND circuit 7 receives a signal of "1." On the other hand, the clock extracting circuit 1 and the code generating circuit 2 receives the signal IN from the detection circuit of the radio receiver at this time. The clock extracting circuit 1 generates the clock signal CLK based on the signal IN for the code generating circuit 2, the correlation circuits 3-0 through 3-7 and the timing control circuit 8. The signal IN is converted into the spread code, and then the spread code is provided to the eight correlation circuits 3-0 through 3-7. Thereafter, the correlation circuits 3-0 through 3-7 generate the correlation signals COR0 through COR7 for the demodulation circuit 4. The correlation signal COR0 is also provided to the preamble detection circuit 5. The preamble detection circuit 5 watches the correlation signal COR0 which is indicative of correlation between the spread code and the preamble symbol (the symbol "0"). When the correlation value of the correlation signal COR0 exceeds the predetermined threshold correlation value, the preamble detection circuit 5 generates the detection signal DET for the AND circuit 7. The AND circuit 7 generates the output signal S7 for the timing control circuit 8 in accordance with the detection signal DET. Therefore, the timing control circuit 8 generates the timing control signal TIM for the demodulation circuit 4, based on the detection signal DET, every 32-chips. Meanwhile, since the output signal S7 is provided to the reset-terminal R of the set-reset flip-flop circuit 6, the set-reset flip-flop circuit 6 is reset and then the AND circuit 7 receives a signal of "0." Accordingly, the timing control circuit 8 does not receive other detection signals which follow the above-described detection signal DET. That is, the timing control circuit 8 cyclically generates the timing control signals TIM in accordance with the detection signal DET which is first generated from the preamble detection circuit 5. When the demodulation circuit 4 receives the timing control signal TIM, the demodulation circuit 4 selects one of the correlation circuits 3-0 through 3-7 which generates a correlation signal which includes the greatest correlation value which exceeds the predetermined threshold correlation value. Then, the demodulation circuit 4 generates the symbol which corresponds to the correlation signal generated from the selected correlation circuit, as the demodulation signal OUT. Hereupon, when the greatest correlation value of the correlation signal does not exceed the predetermined threshold correlation value, the received signal IN is invalidated and then another signal IN is requested to be sent to the synchronous acquisition circuit. The synchronous acquisition circuit as mentioned above is described in a Document 1 (Japanese Patent Publication Laid-open No. Hei 7-131378).

However, in the above-described synchronous acquisition circuit, when noise causes a signal IN which is similar to the preamble symbol (the symbol "0") of the spread code to be input to the code generating circuit 2, the preamble detection circuit 5 may erroneously detect the correlation signal COR0 based on the similar signal IN as the preamble symbol. That is, the detection signal DET may be generated from the preamble detection circuit 5 at an improper timing. As a result, the timing control circuit 8 may cyclically generate the timing control signal TIM in accordance with the improper detection signal DET. On such an occasion as this, the spread code as shown in FIG. 1 causes the demodulation circuit 4 to select one of the correlation circuits 3-0 through 3-7 which generates a correlation signal with the greatest correlation value, which exceeds the predetermined threshold correlation value, in accordance with the improper timing control signal TIM. Therefore, even though the synchronous acquisition is not actually realized, the demodulation circuit 4 may generate the demodulation signal OUT every 32-chips. That is, the demodulation circuit 4 may operate as if the synchronous acquisition is realized and then may generate improper demodulation signals OUT.

In order to suppress the improper demodulation signal OUT from being generated, that is, in order to suppress the preamble detection circuit 5 from detecting the correlation signal COR0 at the improper timing, it has been proposed that a detection threshold of the preamble detection circuit 5 is greater than a demodulation threshold of the demodulation circuit 4. As a result, the chance of the improper detection caused by noise may be decreased. However, under poor surroundings of the radio communication, the above-described countermeasure against the thresholds suppresses the desired preamble symbol from being properly detected. That is, the receiver sensitivity may be decreased. Also, when noise is added to the signal IN so that the correlation signal COR0 exceeds the greater detection threshold of the preamble detection circuit 5, it may be still difficult to suppress the improper detection caused by noise in the preamble detection circuit 5.

SUMMARY OF THE INVENTION

An object of the present invention is to suppress the improper synchronous acquisition in the spread spectrum communication.

According to an aspect of the present invention, for achieving the above-mentioned object, there is provided a synchronous acquisition circuit which includes a code generating circuit and a plurality of correlation circuits. The code generating circuit generates a digital code sequence based on a radio communication signal. The digital code sequence defines a spread spectrum code which includes a preamble symbol. The correlation circuits are coupled to the code generating circuit. The correlation circuits respectively generate a plurality of correlation signals based on the spread spectrum code of the digital code sequence. The synchronous acquisition circuit further includes a detection circuit which is coupled to one of the correlation circuits and a demodulation circuit which is coupled to the correlation circuits. The detection circuit generates a detection signal in accordance with the correlation signal which corresponds to the preamble symbol. The demodulation circuit generates a demodulation signal based on the correlation signals and in accordance with a timing control signal. The synchronous acquisition circuit still further includes a timing control circuit which is coupled to the detection circuit and a correction circuit which is coupled between the demodulation circuit and the timing control circuit. The timing control circuit generates the timing control signal for the demodulation circuit in accordance with the detection signal and a, correction signal. The correction circuit generates the correction signal based on the demodulation signal. The timing control circuit also generates a corrected timing control signal for the demodulation circuit based on the timing control signal and the correction signal, such that the demodulation signal corresponds to the preamble symbol.

According to another aspect of the present invention, for achieving the above-mentioned object, there is provided a synchronous acquisition method of a spread spectrum code. In the method, a digital code sequence is generated based on a received radio communication signal. The digital code sequence defines a spread spectrum code which includes a preamble symbol. A plurality of correlation signals are generated based on the spread spectrum code of the digital code sequence. A detection signal is generated in accordance with the correlation signal which corresponds to the preamble symbol. A timing control signal is generated in accordance with the detection signal. A demodulation signal is generated based on the correlation signals and in accordance with the timing control signal. A correction signal is generated based on the demodulation signal. A corrected timing control signal is generated based on the timing control signal and the correction signal, such that the demodulation signal corresponds to the preamble symbol.

The above and further aspects and novel features of the invention will more fully appear from the following detailed description, appended claims and the accompanying drawings.

DETAILED DESCRIPTION OF THE PREFERRED EMBODIMENTS

Embodiments of the present invention will be described hereinafter with reference to the accompanying drawings. The drawings used for this description illustrate major characteristic parts of embodiments in order that the present invention will be easily understood. However, the invention is not limited by these drawings.

Figure 3:
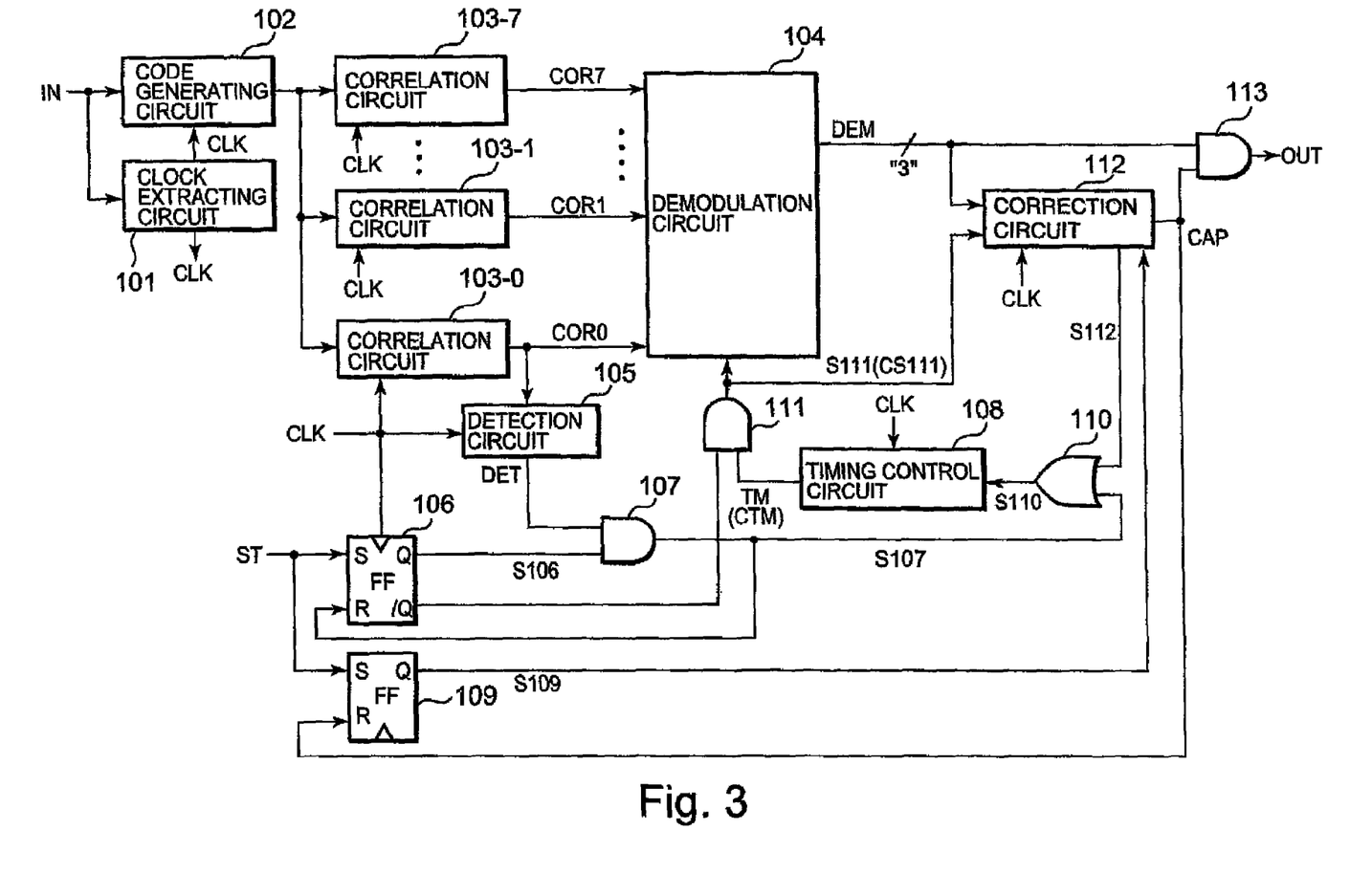
FIG. 3 is a circuit block diagram for describing a synchronous acquisition circuit of a spread spectrum code according to a first preferred embodiment of the present invention.
Figure 4:
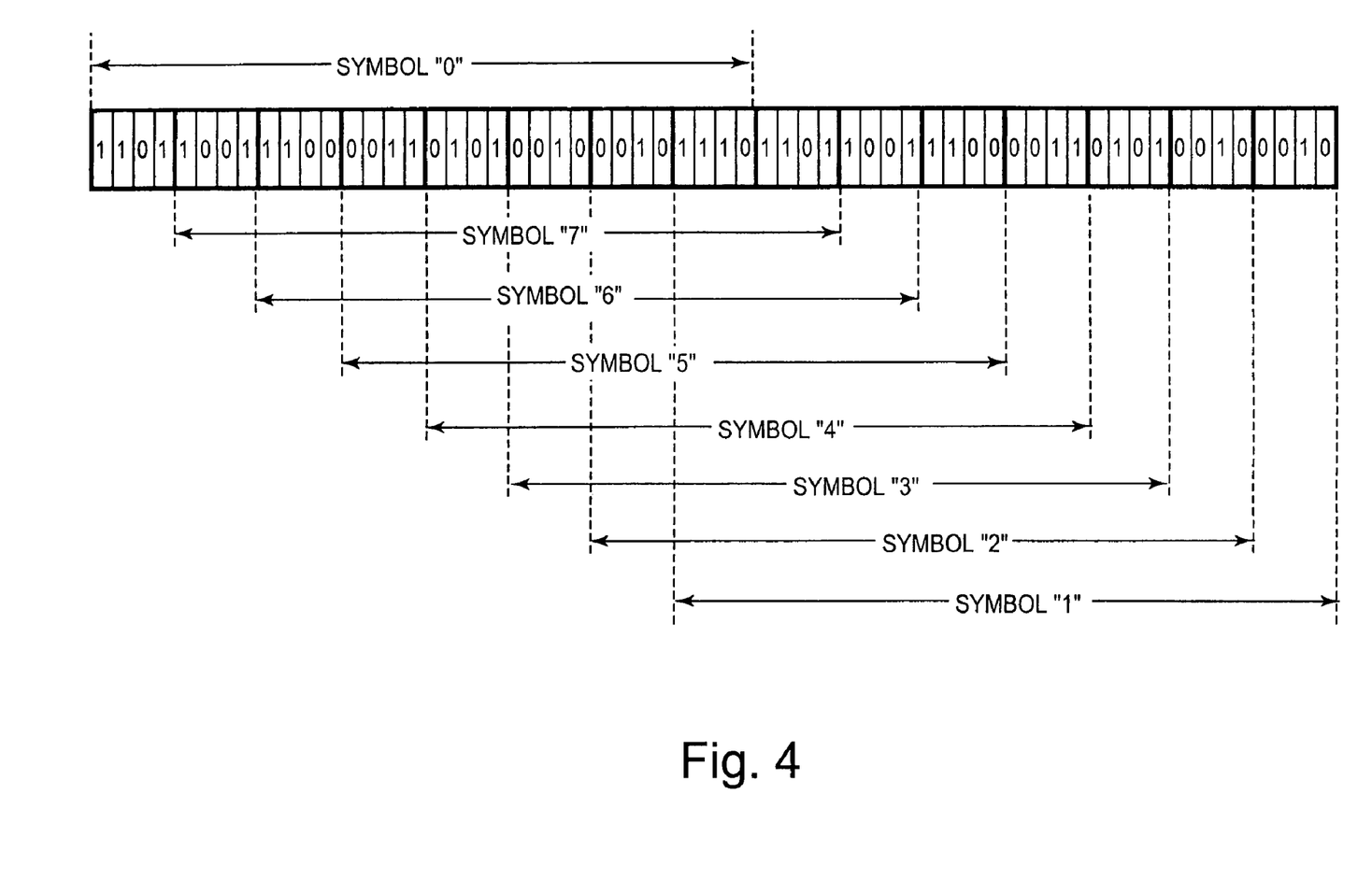
FIG. 4 shows an instance of a digital code sequence which includes a plurality of the spread spectrum codes used for the synchronous acquisition circuit in FIG. 3.

FIG. 3 is a circuit block diagram for describing a synchronous acquisition circuit of a spread spectrum code according to a first preferred embodiment of the present invention. FIG. 4 shows an instance of a digital code sequence which includes a plurality of the spread spectrum codes used for the synchronous acquisition circuit in FIG. 3.

The synchronous acquisition circuit operates in the direct sequence spread spectrum communication, with the spread spectrum codes as shown in FIG. 4. The spread spectrum codes as shown in FIG. 4 are cyclic shift type codes defined by the standard of IEEE 802.15.4 which is applied to the interface of the ZigBee physical layer. The ZigBee is a standard for the close-range radio communication which is executed in the 2.4 GHz Industrial Scientific Medical bandpass. In this example, the digital code sequence may include a pseudo random pattern, and the pseudo random pattern may provide eight spread spectrum codes which are respectively composed of thirty-two chips and are different than each other, by cyclically shifting a starting location of the pseudo random pattern on a 4-chip basis. Hereupon, each of the chips corresponds to a code of "0" or "1" and is equated with a "bit". A plurality of symbols of "0" through "7" are assigned to respective ones of the eight spread spectrum codes. As shown in FIG. 4, for example, the symbol "0" is assigned to the spread spectrum code which starts with "1101" and ends with "1110. " The symbol "7" is assigned to the spread spectrum code which starts with "1001" and ends with "1101. " The symbol "6" is assigned to the spread spectrum code which starts with "1100" and ends with "1001. " The symbol "5" is assigned to the spread spectrum code which starts with "0011" and ends with "1100. " The symbol "4" is assigned to the spread spectrum code which starts with "0101" and ends with "0011. " The symbol "3" is assigned to the spread spectrum code which starts with "0010" and ends with "0101. " The symbol "2" is assigned to the spread spectrum code which starts with "0010" and ends with "0010. " The symbol "1" is assigned to the spread spectrum code which starts with "1110" and ends with "0010."

The synchronous acquisition circuit includes a clock extracting circuit 101, a code generating circuit 102, eight correlation circuits 103-0 through 103-7, a demodulation circuit 104 and a two-port AND circuit 111. The clock extracting circuit 101 generates a clock signal CLK based on a received signal IN which is output from a detection circuit of a radio receiver. The code generating circuit 102 converts the received signal IN into a digital signal of "0" or "1" in accordance with the clock signal CLK, in order to generate the digital code sequence as shown in FIG. 4. In this example, the digital code sequence includes eight spread spectrum codes. In actual radio communication, a specific spread spectrum code is prepended to transmit data of the radio communication signal as a preamble symbol. In this example, four consecutive spread spectrum codes each of which corresponds to the symbol "0" may be transmitted as the preamble symbols, prior to the transmit data. The digital code sequence which is output from the code generating circuit 102 is provided to each of the eight correlation circuits 103-0 through 103-7 which are coupled between the code generating circuit 102 and the demodulation circuit 104. Each of the correlation circuits 103-0 through 103-7 corresponds to respective ones of the eight spread spectrum codes. The correlation circuits 103-0 through 103-7 check correlations between the digital code sequence and the spread spectrum codes which correspond to respective ones of the symbols "0" through "7" in accordance with the clock signal CLK, in order to generate a plurality of correlation signals COR0 through COR7.

In this example, the correlation circuits 103-0 through 103-7 may include thirty-two shift registers, thirty-two comparators and an accumulator. The shift registers respectively shift levels of the received signal IN in accordance with the clock signal CLK and hold the shifted levels of the received signal IN. The comparators compare the held data in the respective shift registers with the respective chips of one of the eight spread spectrum codes. The accumulator adds up output signals from the comparators to output a chip-number which is indicative of coincidence between the held data in the shift registers and the spread spectrum code. Alternatively, the correlation circuits 103-0 through 103-7 may be sliding type correlation circuits.

The correlation circuits 103-0 through 103-7 provide output signals from the accumulator to the demodulation circuit 104. The demodulation circuit 104 includes a predetermined threshold correlation value and selects one of the correlation circuits 103-0 through 103-7 which generates a correlation signal which includes the greatest correlation value exceeding the predetermined threshold correlation value. The demodulation circuit 104 outputs one of the symbols as a demodulation signal DEM, based on the correlation signal which is generated from the selected one of the correlation circuits 103-0 through 103-7, when the demodulation circuit 104 receives a control signal S111 which is output from the two-port AND circuit 111. For example, when the symbol which corresponds to the correlation signal including the greatest correlation value indicates "0, " the value of the demodulation signal DEM is "0. " Also, when the symbol which corresponds to the correlation signal including the greatest correlation value indicates "7", the value of the demodulation signal DEM is "7."

Furthermore, the synchronous acquisition circuit includes a preamble detection circuit 105, a timing control circuit 108, a timing correction circuit 112, a two-port AND circuit 107 and a two-port OR circuit 110. The preamble detection circuit 105 is coupled between the correlation circuit 103-0 and the two-port AND circuit 107. The timing correction circuit 112 is coupled to an output terminal of the demodulation circuit 104 and an output terminal of the two-port AND circuit 111. The two-port OR circuit 110 is coupled to a first output terminal of the timing correction circuit 112 so as to receive a correction signal S112 and is coupled to an output terminal of the two-port AND circuit 107 so as to receive an output signal S107. The timing control circuit 108 is coupled to an output terminal of the two-port OR circuit 110 so as to receive an output signal S110. The timing control circuit 108 is also coupled to the two-port AND circuit 111 so as to provide a timing control signal TM to the two-port AND circuit 111.

The synchronous acquisition circuit still further includes a first set-reset flip-flop circuit 106, a second set-reset flip-flop circuit 109 and a two-port AND circuit 113. The first and second set-reset flip-flop circuits 106 and 109 respectively have a set-terminal S which receives a reception starting signal ST which is indicative of starting a signal reception. The first set-reset flip-flop circuit 106 includes a first output terminal Q coupled to the two-port AND circuit 107 and a second output terminal/Q coupled to the two-port AND circuit 111. The first set-reset flip-flop circuit 106 further includes a reset terminal R coupled to an output terminal of the two-port AND circuit 107 so as to receive an output signal S107 from the two-port AND circuit 107. The second set-reset flip-flop circuit 109 includes an output terminal Q coupled to the timing correction circuit 112. The second set-reset flip-flop circuit 109 also includes a reset terminal R coupled to a second output terminal of the timing correction circuit 112 so as to receive a correction completion signal CAP. The two-port AND circuit 113 is coupled to the demodulation circuit 104 and the second output terminal of the timing correction circuit 112.

The preamble detection circuit 105 receives the correlation signal COR0 which is output from the correlation circuit 103-0 and corresponds to the preamble symbol "0". The preamble detection circuit 105 may include a comparator which has a predetermined detection threshold value, in order to compare a correlation value of the correlation signal COR0 with the predetermined detection threshold value. When the correlation signal COR0 includes the correlation value which exceeds the predetermined detection threshold value, the preamble detection circuit 105 generates a detection signal DET for the two-port AND circuit 107.

The timing control circuit 108 counts a pulse number of the clock signal CLK, in order to generate a timing control signal TM which has a width of one of the clock signal CLK every 32-chips which corresponds to a width of one of the symbols. The timing control circuit 108 starts counting the pulse number of the clock signal CLK when receiving the output signal S110 from the two-port OR circuit 110. The timing control circuit 108 provides the timing control signal TM to the two-port AND circuit 111, and then the control signal S111 is provided to the demodulation circuit 104 based on the timing control signal TM. The demodulation circuit 104 generates the demodulation signal DEM for the two-port AND circuit 113 and the timing correction circuit 112 in accordance with the control signal S111.

The timing correction circuit 112 generates the correction signal S112, based on the demodulation signal DEM which is output in accordance with the control signal S111 during a synchronous acquisition operation. In this example, the symbol "0" is used as the preamble symbol as described above. Therefore, when the value of the demodulation signal DEM is "0", the timing correction circuit 112 outputs the correction completion signal CAP to indicate that the synchronous acquisition operation is properly executed. On the other hand, when the value of the demodulation signal DEM is not "0", the timing correction circuit 112 outputs the correction signal S112 based on the value of the demodulation signal DEM. That is, when the value of the demodulation signal DEM is "N" (N is an either integer of "1" through "7"), the timing correction circuit 112 outputs the correction signal S112 behind the generation of the control signal S111 by [32−4N] times the width of the one of the clock signal CLK. The correction signal S112 is provided to the two-port OR circuit 110, and the correction completion signal CAP is provided to the two-port AND circuit 113 and the reset terminal R of the second set-reset flip-flop circuit 109. The two-port AND circuit 113 generates an output signal OUT based on the demodulation signal DEM, in accordance with the correction completion signal CAP.

Figure 5:
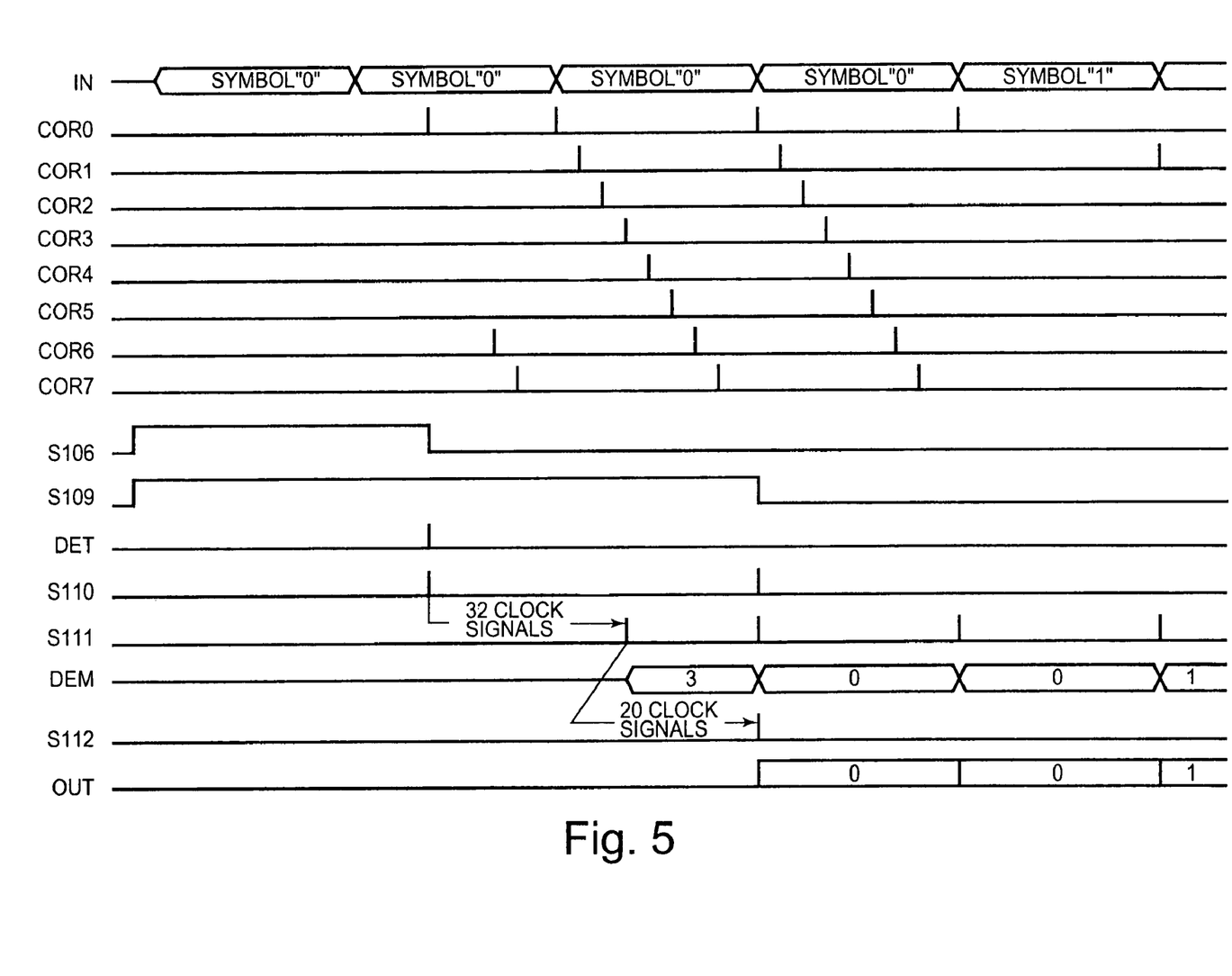
FIG. 5 is a signal waveform diagram for describing the operation of the synchronous acquisition circuit in FIG. 3.

The operation of the synchronous acquisition circuit according to the first preferred embodiment of the present invention is described below. FIG. 5 is a signal waveform diagram for describing the operation of the synchronous acquisition circuit in FIG. 3.

In this example, the received signal IN includes the four consecutive spread spectrum codes of the symbol "0" which are transmitted as the preamble symbol at first and which are followed by the spread spectrum codes of the symbol "1", the symbol "2", . . . as the transmit data. Also, the first set-reset flip-flop circuit 106 is set by the reception starting signal ST in order to generate a first output signal S106 which is kept at a "High" level (hereinafter referred to as the "H" level) from the output terminal Q. Likewise, the second set-reset flip-flop circuit 109 is set by the reception starting signal ST in order to generate a second output signal S109 which is kept at a "H" level from the output terminal Q. The second output signal S109 indicates that the synchronous acquisition circuit operates during the synchronous acquisition operation.

When the received signal IN is provided to the clock extracting circuit 101, the clock signal CLK is provided to the code generating circuit 102, the correlation circuits 103-0 through 103-7, the first and second set-reset flip-flop circuits 106 and 109, the timing control circuit 108 and the timing correction circuit 112. Meanwhile, the received signal IN is converted into the digital code sequence which includes the spread spectrum codes by the code generating circuit 102. Then, the digital code sequence is provided to respective ones of the correlation circuits 103-0 through 103-7 The correlation circuits 103-0 through 103-7 check the correlations between the digital code sequence and the spread spectrum codes which correspond to respective ones of the symbols "0" through "7", in order to generate the correlation signals COR0 through COR7 in accordance with the clock signal CLK. In addition, peak values of the correlation signals COR0 through COR7 are shown in FIG. 5. The correlation circuits 103-0 through 103-7 respectively output the correlation signals COR0 through COR7, in accordance with the spread spectrum codes which are generated by cyclically shifting the starting location of the pseudo random pattern on a 4-chip basis. That is, the peak values of the correlation signals COR0 through COR7 sequentially appear on a 4-clock basis. Therefore, the peak value of the correlation signals COR1 appears behind the appearance of the peak value of the correlation signal COR0 by 4 clocks. Likewise, the peak values of the correlation signals COR2 through COR7 respectively appear behind the appearance of the peak value of the correlation signal COR0 by 8, 12, 16, 20, 24 and 28 clocks. Also, when the preamble symbol "0" is normally received, the demodulation circuit 104 selects the correlation circuit 103-0 and then outputs the correlation signal COR0 as the demodulation signal DEM.

Hereupon, it is assumed that the first preamble symbol "0" is not normally received because of noise, and the second preamble symbol "0" is received. That is, it is assumed that the peak value of the correlation signal COR0 appears during the reception of the second preamble "0" and then the detection signal DET kept at the "H" level is output from the preamble detection circuit 105 in accordance with the appearance of the peak value of the correlation signal COR0, as shown in FIG. 5. At this time, the first output signal S106 output from the first set-reset flip-flop circuit 106 is kept at the "H" level by the reception starting signal ST. Therefore, the output signal S107 output from the two-port AND circuit 107 is turned to the "H" level. Then, the output signal S110 output from the two-part OR circuit 110 is turned to the "H" level. As a result, the timing control circuit 108 starts counting the pulse number of the clock signal CLK in accordance with the output signal S110. That is, the timing control circuit 108 starts counting the pulse number of the clock signal CLK in accordance with the generation of the detection signal DET. On the other hand, the output signal S107 is also provided to the reset terminal R of the first set-reset flip-flop circuit 106 in order to reset the first set-reset flip-flop circuit 106. After the first set-reset flip-flop circuit 106 is reset, the output signals S106, S107 and S110 are turned to the "Low" level (hereinafter referred to as the "L" level). The timing control circuit 108 generates the timing control signal TM behind the generation of the detection signal DET by 32 clock signals CLK. The two-port AND circuit 111 generates the control signal S111 for the demodulation circuit 104 and the timing correction circuit 112 in accordance with the timing control signal TM. As described above, the demodulation circuit 104 selects one of the correlation circuits 103-0 through 103-7 which generates the correlation signal which includes the greatest correlation value exceeding the predetermined threshold correlation value, when the demodulation circuit 104 receives a control signal S111 generated based on the timing control signal TM. Then, the demodulation circuit 104 outputs one of the symbols which corresponds to the correlation signal which is generated from the selected one of the correlation circuits 103-0 through 103-7. In this example, as shown in FIG. 5, the peak value of the correlation signal COR3 appears when the demodulation circuit 104 receives the control signal S111 generated based on the timing control signal TM. That is, the demodulation circuit 104 generates the symbol "3" as the demodulation signal DEM, for the two-port AND circuit 113 and the timing correction circuit 112. At this time, since the correction completion signal CAP is kept at the "L" level, the two-port AND circuit 113 does not generate the output signal OUT.

That the demodulation circuit 104 selects the correlation circuit 103-3 in accordance with the preamble symbol "0" means that the detection signal DET has been generated behind the reception of the preamble symbol "0" by 12 clock signals CLK. That is, the timing control signal TM and the control signal S111 have been generated behind desired generation timing by 12 clock signals CLK. When the timing correction circuit 112 receives the symbol "3" as the demodulation signal DEM, the timing correction circuit 112 outputs the correction signal S112 behind the generation of the control signal S111 by [32−4×3] times the width of the one of the clock signal CLK. That is, the two-port OR circuit 110 receives the correction signal S112 behind the generation of the control signal S111 by 20 clock signals CLK. Then, the output signal S110 which is turned to the "H" level is provided to the timing control circuit 108 in accordance with the correction signal S112. Immediately, the timing control circuit 108 generates a corrected timing control signal CTM in accordance with the output signal S110 generated based on the timing control signal TM and the correction signal S112. Furthermore, the two-port AND circuit 111 generates a corrected control signal CS111 for the demodulation circuit 104 and the timing correction circuit 112, in accordance with the corrected timing control signal CTM.

Then, the demodulation circuit 104 selects one of the correlation circuits 103-0 through 103-7 which generates the correlation signal which includes the greatest correlation value exceeding the predetermined threshold correlation value, when receiving the corrected control signal CS111 generated based on the corrected timing control signal CTM. In this example, the corrected control signal CS111 is generated behind the generation of the first control signal S111 by 20 clock signals CLK. As shown in FIG. 5, when the corrected control signal CS111 is generated, the peak value of the correlation signal COR0 appears. Therefore, the demodulation circuit 104 generates the preamble symbol "0" as the demodulation signal DEM, for the two-port AND circuit 113 and the timing correction circuit 112. Since the value of the demodulation signal DEM is "0", the timing correction circuit 112 outputs the correction completion signal CAP which indicates that the synchronous acquisition operation is properly executed. That is, the two-port AND circuit 113 receives the correction completion signal CAP which is kept at the "H" level. In addition, the timing correction circuit 112 does not output the correction signal S112 at this time. As a result, the output signal OUT is generated from the two-port AND circuit 113, based on the demodulation signal DEM which corresponds to the preamble symbol "0". Meanwhile, the correction completion signal CAP kept at the "H" level is provided to the reset terminal R of the second set-reset flip-flop circuit 109. Then, the second set-reset flip-flop circuit 109 generates the output signal S109 which is turned to the "L" level for the timing correction circuit 112. Accordingly, the timing correction circuit 112 stops its operation. Thereafter, even if the demodulation signal DEM which does not correspond to the preamble symbol "0" is output from the demodulation circuit 104, the timing control signal TM and the control signal S111 are not generated. As a result, the output signal OUT is generated from the two-port AND circuit 113, based on the demodulation signal DEM which corresponds to the received symbols. Alternatively, when the above-described synchronous acquisition operation is not properly executed, the demodulation signal DEM does not correspond to the preamble symbol "0". On such an occasion as this, the timing correction circuit 112 attempts to correct the generation timing of the timing control signal TM for the second time. Also, when the first preamble symbol "0" is normally received, the output signal OUT is generated based on the demodulation signal DEM in accordance with the first timing control signal TM, without correcting the generation timing of the timing control signal TM.

According to the first preferred embodiment, the synchronous acquisition circuit includes the timing correction circuit which corrects the generation timing of the timing control signal TM in accordance with the demodulation signal DEM. Therefore, the synchronous acquisition operation may be executed without setting the detection threshold of the preamble detection circuit 105 greater than the demodulation threshold of the demodulation circuit 104. That is, the synchronous acquisition operation may be executed while suppressing deterioration of the receiver sensitivity.

In the above-described preferred embodiment, the pseudo random pattern may provide "n" spread spectrum codes ("n" is a counting number), by cyclically shifting a starting location of the pseudo random pattern on "m"-chip basis ("m" is a counting number). Also, the specific pattern which is not the symbol "0" may be prepended to the transmit data of the radio communication signal as a preamble symbol. Furthermore, an internal clock signal ICLK may be used instead of the clock signal CLK generated from the above-described clock extracting circuit 101. On such an occasion as this, the internal clock signal ICLK which includes a frequency 16 times chip-velocity may be provided to the code generating circuit 102, the correlation circuits 103-0 through 103-7, the preamble detection circuit 105, the timing control circuit 108 and the timing correction circuit 112. Then, the received signal IN is oversampled in the code generating circuit 102 and the correlation circuits 103-0 through 103-7 receive 16 sampled-data per 1-chip. The correlation circuits 103-0 through 103-7 check correlations between the sampled-data which includes 512 bits and the spread spectrum codes in accordance with the internal clock signal ICLK, in order to generate the correlation signals COR0 through COR7. The preamble detection circuit 105 detects the timing at which the correlation value of the correlation signal COR0 becomes the greatest, in order to generate the detection signal DET. The timing control circuit 108 generates the timing control signal TM every 512-clocks of the internal clock signal ICLK. The timing correction circuit 112 generates the correction signal S112 in accordance with the demodulation signal DEM behind the generation of the corrected control signal CS111 by 320 internal clock signals CLK.

What is claimed is:
1. A synchronous acquisition circuit comprising:
a code generating circuit which generates a digital code sequence based on a radio communication signal, wherein the digital code sequence defines a plurality of spread spectrum codes, one of the spread spectrum codes corresponding to a preamble symbol;
a plurality of correlation circuits, coupled to the code generating circuit, which respectively generate a plurality of correlation signals based on the spread spectrum codes of the digital code sequence;
a detection circuit, coupled to one of the correlation circuits, which generates a detection signal in accordance with the correlation signal which corresponds to the preamble symbol;
a demodulation circuit, coupled to the correlation circuits, which generates a demodulation signal based on the correlation signals and in accordance with a timing control signal;
a timing control circuit, coupled to the detection circuit, which generates the timing control signal for the demodulation circuit in accordance with the detection signal and a correction signal; and
a correction circuit, coupled between the demodulation circuit and the timing control circuit, which generates the correction signal based on the demodulation signal,
wherein the timing control circuit generates a corrected timing control signal for the demodulation circuit based on the timing control signal and the correction signal, such that the demodulation signal corresponds to the preamble symbol,
wherein the correction circuit checks whether the demodulation signal corresponds to the preamble symbol, and generates the correction signal when the demodulation signal does not correspond to the preamble symbol, and
wherein the correction circuit generates a correction completion signal when the demodulation signal corresponds to the preamble symbol.

2. The synchronous acquisition circuit according to claim 1, wherein the demodulation signal is externally output from the synchronous acquisition circuit when the correction completion signal is generated.

3. The synchronous acquisition circuit according to claim 1, further comprising:
a flip-flop circuit coupled to the correction circuit so as to receive the correction completion signal, wherein the flip-flop circuit suspends a function of the correction circuit in accordance with the correction completion signal.

4. A synchronous acquisition method of a spread spectrum code, comprising:
receiving a radio communication signal;
generating a digital code sequence based on the received radio communication signal, wherein the digital code sequence defines a plurality of spread spectrum codes, one of the spread spectrum codes corresponding to a preamble symbol;
generating a plurality of correlation signals based on the spread spectrum codes of the digital code sequence;
generating a detection signal in accordance with the correlation signal which corresponds to the preamble symbol;
generating a timing control signal in accordance with the detection signal;
generating a demodulation signal based on the correlation signals and in accordance with the timing control signal;
generating a correction signal based on the demodulation signal;
generating a corrected timing control signal based on the timing control signal and the correction signal, such that the demodulation signal corresponds to the preamble symbol;
checking whether the demodulation signal corresponds to the preamble symbol, wherein the correction signal is generated when the demodulation signal does not correspond to the Preamble symbol; and
generating a correction completion signal when the demodulation signal corresponds to the preamble symbol.

5. The synchronous acquisition method according to claim 4, wherein the correction signal is not generated after the correction completion signal is generated.

6. A synchronous acquisition circuit comprising:
a code generating circuit which generates a digital code sequence based on a radio communication signal, wherein the digital code sequence defines a plurality of spread spectrum codes, one of the spread spectrum codes corresponding to a preamble symbol;
a plurality of correlation circuits, coupled to the code generating circuit, which respectively generate a plurality of correlation signals based on the spread spectrum codes of the digital code sequence;
a detection circuit, coupled to one of the correlation circuits, which generates a detection signal in accordance with the correlation signal which corresponds to the preamble symbol;
a demodulation circuit, coupled to the correlation circuits, which generates a demodulation signal based on the correlation signals and in accordance with a timing control signal;
a timing control circuit, coupled to the detection circuit, which generates the timing control signal for the demodulation circuit in accordance with the detection signal and a correction signal; and
a correction circuit, coupled between the demodulation circuit and the timing control circuit, which generates the correction signal based on the demodulation signal,
wherein the timing control circuit generates a corrected timing control signal for the demodulation circuit based on the timing control signal and the correction signal, such that the demodulation signal corresponds to the preamble symbol, and
wherein the correction circuit generates the correction signal as lagging behind generation of the timing control signal, based on a symbol interval of the digital code sequence and a value of the demodulation signal.

7. A synchronous acquisition method of a spread spectrum code, comprising:
receiving a radio communication signal;
generating a digital code sequence based on the received radio communication signal, wherein the digital code sequence defines a plurality of spread spectrum codes, one of the spread spectrum codes corresponding to a preamble symbol;
generating a plurality of correlation signals based on the spread spectrum codes of the digital code sequence;
generating a detection signal in accordance with the correlation signal which corresponds to the preamble symbol;
generating a timing control signal in accordance with the detection signal;
generating a demodulation signal based on the correlation signals and in accordance with the timing control signal;
generating a correction signal based on the demodulation signal; and generating a corrected timing control signal based on the timing control signal and the correction signal, such that the demodulation signal corresponds to the preamble symbol,
wherein the correction signal is generated as lagging behind generation of the timing control signal, based on a symbol interval of the digital code sequence and a value of the demodulation signal.

* * * * *